(12) United States Patent
Sugiyama et al.

(10) Patent No.: US 6,313,060 B1
(45) Date of Patent: Nov. 6, 2001

(54) CATALYST FOR RING-OPENING POLYMERIZATION OF ALKYLENE OXIDE, METHOD FOR PREPARATION THEREOF AND USE THEREOF

(75) Inventors: Kayoko Sugiyama; Hiroki Fukuda; Akio Horie; Hiroshi Wada, all of Kanagawa (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 09/486,717

(22) PCT Filed: Jul. 9, 1999

(86) PCT No.: PCT/JP99/03738
§ 371 Date: Mar. 8, 2000
§ 102(e) Date: Mar. 8, 2000

(87) PCT Pub. No.: WO00/02951
PCT Pub. Date: Jan. 20, 2000

(30) Foreign Application Priority Data

Jul. 10, 1998 (JP) .................................................. 10-196192

(51) Int. Cl.$^7$ ...................................................... B01J 27/26
(52) U.S. Cl. .......................... 502/175; 502/152; 502/153; 502/200; 521/174; 528/52; 528/56; 528/57; 528/59; 528/76; 528/77; 528/409; 549/512; 549/513; 549/518; 549/539; 560/25; 560/26; 560/158; 560/330; 560/358; 560/359; 560/360; 568/617; 568/622; 568/623; 568/624

(58) Field of Search ...................................... 502/152, 153, 502/175, 200; 521/174; 528/52, 55, 56, 57, 59, 76, 77, 409; 549/512, 513, 518, 539; 560/25, 26, 158, 330, 358, 359, 360; 568/617, 622, 623, 624

(56) References Cited

U.S. PATENT DOCUMENTS 5,158,922 * 10/1992 Hinney et al. ........................ 502/175
6,036,879 * 4/2000 Lawrey et al. ......................... 528/59
6,204,357 * 3/2000 Ooms et al. .......................... 502/159

* cited by examiner

*Primary Examiner*—John M. Cooney, Jr.
(74) *Attorney, Agent, or Firm*—Oblon, Spivak, McClelland, Maier & Neustadt, P.C.

(57) ABSTRACT

A resilient polyurethane foam produced by using a polyether polyol produced by reacting alkylene oxides with a polyhydroxy compound having at least 2 hydroxyl groups as an initiator in the presence of the catalyst for alkylene oxide ring-opening polymerization of the present invention, which is excellent in foam physical properties, vibration characteristics and molding properties.

10 Claims, No Drawings

CATALYST FOR RING-OPENING POLYMERIZATION OF ALKYLENE OXIDE, METHOD FOR PREPARATION THEREOF AND USE THEREOF

TECHNICAL FIELD

The present invention relates to a catalyst for alkylene oxide ring-opening polymerization, a method for producing a double metal cyanide complex catalyst, a method for producing a polyether polyol obtainable by using the catalyst for alkylene oxide ring-opening polymerization, a method for producing a polyurethane compound obtainable by using said polyether polyol, a method for producing a resilient polyurethane foam, and a method for producing a polyurethane elastomer.

BACKGROUND ART

It has been known to produce a resilient polyurethane foam and a polyurethane elastomer, by reacting a polyether polyol with an isocyanate group-containing low molecular weight compound in the presence of a foaming agent. An alkali catalyst such as potassium hydroxide has been known as a catalyst for producing said polyether polyol.

In a case of producing a polyether polyol by subjecting an alkylene oxide to a ring-opening polymerization reaction by using said alkali catalyst, a monol (unsaturated monol) having unsaturated groups will be formed as by-product, and the amount of the unsaturated monol will increase with the increase in the molecular weight of the polyether polyol (decrease in hydroxyl number X). Accordingly, with a polyether polyol having a hydroxyl number of 34, for example, the unsaturation is usually at a level of 0.08 meq/g.

In a case of producing a resilient polyurethane foam by using this polyether polyol having a relatively high unsaturation of a level of 0.08 meq/g, problems may arise such as decrease in hardness, decrease in ball rebound, deterioration in compression set, and decrease in curing property at the time of forming a foam.

Further, in a case of producing a polyurethane elastomer by using a polyether polyol having a relatively high unsaturation, problems may arise such as insufficiency in strength, decrease in elongation and failure in tack.

On the other hand, it has been known to use a double metal cyanide complex as a catalyst for ring-opening polymerization reaction of an alkylene oxide (U.S. Pat. Nos. 3,278,457–9). A method for producing a double metal cyanide complex is disclosed in e.g. U.S. Pat. No. 3,427,256, U.S. Pat. No. 3,941,849, U.S. Pat. No. 4,472,560 and U.S. Pat. No. 4,477,589, and a method for producing a polyether polyol by using a double metal cyanide complex as a catalyst is disclosed in e.g. U.S. Pat. No. 4,055,188 and U.S. Pat. No. 4,721,818.

Further, e.g. JP-A-3-14812 discloses that in a case where a resilient polyurethane foam is produced by using a polyether polyol produced by using a double metal cyanide complex as a catalyst and having, for example, a hydroxyl number of 34 and a low unsaturation of at most 0.02 meq/g, the above-mentioned problems such as decrease in hardness, decrease in ball rebound, deterioration in compression set, and decrease in curing property at the time of forming a foam, can significantly be overcome, and further, comfortableness to sit on will improve. However, it has been still desired to improve molding properties, particularly easiness in crushing.

Further, JP-A-4-145123 and JP-A-8-311171 disclose to use tert-butyl alcohol as a ligand for the double metal cyanide complex. In a case of producing a resilient polyurethane foam by using the polyether polyol produced by using said double metal cyanide complex as a catalyst, molding properties of the obtained foam are also inadequate, particularly in view of uneasiness in crushing. Further, the polyether polyol produced by using said double metal cyanide complex as a catalyst, has a spread molecular-weight distribution and a high viscosity and unfavorably influences physical properties of the obtained polyurethane elastomer if the molecular weight per hydroxyl group exceeds about 3000.

Further, U.S. Pat. No. 5,627,120 discloses to use tripropylene glycol monomethyl ether as a ligand for the double metal cyanide complex. In a case of producing a resilient polyurethane foam by using the polyether polyol produced by using said double metal cyanide complex as a catalyst, the molding properties of the obtained foam are also inadequate particularly in view of uneasiness in crushing.

In recent years, various studies have been made to improve performances of a resilient polyurethane foam. Particularly, along with enlargement of a sheet cushion, increase in the thickness of a product, and complication of the shape, it has been desired to improve performances called molding properties such as easiness in crushing, in addition to comfortableness to sit on. "Easiness in crushing" is referred to as "crushing property" and meant to be easiness in operation to crush the foam by e.g. a roller for connection of the foam released from the mold, i.e. crushing. If the closed cell ratio of the foam is high, cracks will form on the foam at the time of crushing, and such is unfavorable, and when the closed cell ratio is low, crushing can easily be carried out.

With respect to a resilient polyurethane foam produced by using a polyether polyol produced by using a double metal cyanide complex which has conventionally been proposed as a catalyst, performances of the foam are not adequate, and particularly crushing property of the sheet cushion is poor, such being problematic. Accordingly, in a case of forming a sheet cushion having a large size and a complicated shape, failure in forming will frequently arise, such being problematic. Further, physical properties of a polyurethane elastomer produced by using the polyether polyol produced by using said double metal cyanide complex catalyst is not adequate.

DISCLOSURE OF THE INVENTION

The present invention has been made to overcome the above-described problems, and provides the following.

A catalyst for alkylene oxide ring-opening polymerization, which comprises a double metal cyanide complex catalyst having, as an organic ligand, a compound represented by the following formula (1) [hereafter sometimes referred to as compound (X)] coordinated thereto:

$$R^1-C(CH_3)_2(OR^0)_nOH \qquad (1)$$

wherein $R^1$ is a methyl group or an ethyl group, $R^0$ is an ethylene group or a group having a hydrogen atom in said ethylene group substituted by a methyl group or an ethyl group, and n is an integer of from 1 to 3.

A catalyst for alkylene oxide ring-opening polymerization, which comprises a double metal cyanide complex having, as organic ligands, the above-mentioned compound (X) and another compound, coordinated thereto.

A method for producing a double metal cyanide complex, which comprises having an organic ligand coordinated to a reaction product obtained by reacting a metal halide with an alkali metal cyanometalate, in an aqueous medium, wherein the above-mentioned compound (X) is used as the organic ligand.

A method for producing a double metal cyanide complex, which comprises having organic ligands coordinated to a reaction product obtained by reacting a metal halide with an alkali metal cyanometalate, in an aqueous medium, wherein the above-mentioned compound (X) and another compound are used together as the organic ligands.

A method for producing a polyether monol, which comprises subjecting alkylene oxides including an alkylene oxide having a carbon number of at least 3, to ring-opening polymerization with a monohydroxy compound as an initiator in the presence of the above-mentioned catalyst for alkylene oxide ring-opening polymerization.

A method for producing a polyether monol, which comprises subjecting alkylene oxides including an alkylene oxide having a carbon number of at least 3, to ring-opening polymerization with a monohydroxide compound as an initiator in the presence of the above-mentioned catalyst for alkylene oxide ring-opening polymerization, and then subjecting ethylene oxide to ring-opening polymerization in the presence of an alkali catalyst.

A method for producing a polyether polyol, which comprises subjecting alkylene oxide including an alkylene oxide having a carbon number of at least 3, to ring-opening polymerization with a polyhydroxy compound having at least 2 hydroxyl groups as an initiator in the presence of the above-mentioned catalyst for alkylene oxide ring-opening polymerization.

A method for producing a polyether polyol, which comprises subjecting alkylene oxides including an alkylene oxide having a carbon number of at least 3, to ring-opening polymerization with a polyhydroxy compound having at least 2 hydroxyl groups as an initiator in the presence of the above-mentioned catalyst for alkylene oxide ring-opening polymerization, and then subjecting ethylene oxide to ring-opening polymerization in the presence of an alkali catalyst.

A method for producing a polyurethane compound, which comprises reacting the polyether polyol produced by the above-mentioned production method with an isocyanate group-containing low molecular weight compound.

A method for producing a polyurethane foam, which comprises reacting the polyether polyol produced by the above-mentioned production method with an isocyanate group-containing low molecular weight compound in the presence of a foaming agent.

A method for producing a resilient polyurethane foam, which comprises subjecting alkylene oxides including an alkylene oxide having a carbon number of at least 3, to ring-opening polymerization with a polyhydroxy compound having from 2 to 8 hydroxyl groups as an initiator in the presence of the above-mentioned catalyst for alkylene oxide ring-opening polymerization, and then reacting a polyether polyol having from 2 to 8 hydroxyl groups, a hydroxyl number of from 5 to 38 mgKOH/g and an oxyethylene group content of from 5 to 30 wt % and obtained by ring-opening polymerization of ethylene oxide in the presence of an alkali catalyst, with an isocyanate group-containing low molecular weight compound in the presence of a foaming agent.

A method for producing a polyurethane elastomer, which comprises reacting an isocyanate group-terminated urethane prepolymer obtained by reacting a first polyether polyol with an isocyanate group-containing low molecular weight compound, with a curing agent containing a second polyether polyol, wherein at least one of the first polyether polyol and the second polyether polyol is the polyether polyol produced by the above-mentioned production method.

A method for producing a polyurethane elastomer, which comprises reacting an isocyanate group-terminated urethane prepolymer obtained by reacting the polyether polyol produced by the above-mentioned production method with an isocyanate group-containing low molecular weight compound, with a curing agent containing an active hydrogen compound other than a polyether polyol as the main component and containing no polyether polyol.

BEST MODE FOR CARRYING OUT THE INVENTION

The double metal cyanide complex which is the catalyst for alkylene oxide ring-opening polymerization of the present invention, can be produced by having an organic ligand coordinated to a reaction product obtained by reacting a metal halide with an alkali metal cyanometalate, in an aqueous medium.

As the metal for the metal halide to be used in the present invention, it is preferred to use at least one member selected from the group consisting of Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II). Particularly preferred is Zn(II) or Fe(II).

The metal halide is used preferably as an aqueous metal halide solution. The concentration of the aqueous metal halide solution is preferably at least 0.1 g/cc, particularly preferably at least 0.5 g/cc. Further, it is preferably at most the saturation concentration.

At the concentration region less than the above-mentioned predetermined concentration, a double metal cyanide complex having a high crystallizability will be obtained, and catalytic activity will decrease. Further, if the reaction is carried out under a condition exceeding the saturation concentration, mixture state of the solution will be non-uniform, and a double metal cyanide complex having a low catalytic activity will be obtained.

As the metal constituting the cyanometalate in the alkali metal cyanometalate, it is preferred to use at least one member selected from the group consisting of Fe(II), Fe(III), Co(II), Co(III), Cr(II), Cr(III), Mn(II), Mn(III), Ni(II), V(IV) and V(V). Particularly preferred is Co(III) or Fe(III).

The alkali metal cyanometalate is used preferably as an aqueous alkali metal cyanometalate solution. The concentration of the aqueous alkali metal cyanometalate solution is preferably at most 0.5 g/cc, particularly preferably at most 0.2 g/cc. Further, it is preferably at least 0.02 g/cc. If the reaction is carried out under a condition exceeding the predetermined concentration, the portion of the aqueous metal halide solution, to which the aqueous alkali metal cyanometalate solution is dropwise added, will be partially an alkali metal cyanometalate excessive region, and a similar effect to the above-mentioned case where the concentration of the metal halide is low, whereby catalytic activity will decrease. Further, if the reaction is carried out under a condition of a low concentration, catalytic activity will decrease.

The reaction of the metal halide with the alkali metal cyanometalate is carried out in an aqueous medium. Said reaction is carried out preferably by mixing the aqueous metal halide solution with.the aqueous alkali metal cyanometalate solution, particularly preferably by dropwise adding the aqueous alkali metal cyanometalate solution to the aqueous metal halide solution.

The reaction temperature is preferably at least 0° C., particularly preferably at least 30° C. Further, it is preferably lower than 70° C., particularly preferably lower than 50° C.

If the reaction is carried out at a high temperature region, a double metal cyanide complex having a high crystallizability will be synthesized, and further, an organic ligand can not coordinate thereto, whereby no catalytic activity will be obtained. Further, at a low temperature region, the reaction for synthesis of the double metal cyanide complex will be inadequate, and catalytic activity will decrease.

As the reaction product thus obtained, $Zn_3[Fe(CN)_6]_2$, $Zn_3[Co(CN)_6]_2$, $Fe[Fe(CN)_6]$ or $Fe[CO(CN)_6]$ may, for example, be mentioned, and $Zn_3[Co(CN)_6]_2$ i.e. zinc hexacyanocobaltate is particularly preferred. The double metal cyanide complex of the present invention is preferably a double metal cyanide complex having an a organic ligand coordinated to zinc hexacyanocobaltate.

Then, to the above-mentioned reaction product, an organic ligand is coordinated. In the present invention, as the organic ligand, a compound represented by the following formula (1) is used:.

$$R^1\text{—}C(CH_3)_2(OR^0)_n OH \qquad (1)$$

wherein $R^1$ is a methyl group or an ethyl group, $R^0$ is an ethylene group or a group having a hydrogen atom in said ethylene group substituted by a methyl group or an ethyl group, and n is an integer of from 1 to 3.

$R^0$ is particularly preferably a group selected from an ethylene group, a propylene group, an ethylethylene group, a 1,2-dimethylethylene group and a 1,1-dimethylethylene group.

As the compound (X), specifically the following compounds are preferred.

In a case where n is 1:
Ethylene glycol mono-tert-butyl ether having a methyl group as $R^1$ and an ethylene group as $R^0$, propylene glycol mono-tert-butyl ether having a methyl group as $R^1$ and a propylene group as $R^0$, 1,2-butylene glycol mono-tert-butyl ether having a methyl group as $R^1$ and an ethylethylene group (1,2-butylene group) as $R^0$, isobutylene glycol mono-tert-butyl ether having a methyl group as $R^1$ and a 1,1-dimethylethylene group (isobutylene group as $R^0$, ethylene glycol mono-tert-pentyl ether having an ethyl group as $R^1$ and an ethylene group as $R^0$, propylene glycol mono-tert-pentyl ether having an ethyl group as $R^1$ and a propylene group as $R^0$, 1,2-butylene glycol mono-tert-pentyl ether having an ethyl group as $R^1$ and an ethylethylene group as $R^0$, and isobutylene glycol mono-tert-pentyl ether having an ethyl group as $R^1$ and a 1,1-dimethylethylene group as $R^0$.

Particularly preferred are ethylene glycol mono-tert-butyl ether, propylene glycol mono-tert-butyl ether, ethylene glycol mono-tert-pentyl ether and propylene glycol mono-tert-pentyl ether.

In a case where n is 2:
Diethylene glycol mono-tert-butyl ether having a methyl group as $R^1$ and an ethylene group as $R^0$, dipropylene glycol mono-tert-butyl ether having a methyl group as $R^1$ and a propylene group as $R^0$, di-1,2-butylene glycol mono-tert-butyl ether having a methyl group as $R^1$ and an ethylethylene group as $R^0$, diisobutylene glycol mono-tert-butyl ether having a methyl group as $R^1$ and a 1,1-dimethylethylene group as $R^0$, diethylene glycol mono-tert-pentyl ether having an ethyl group as $R^1$ and an ethylene group as $R^0$, dipropylene glycol mono-tert-pentyl ether having an ethyl group as $R^1$ and a propylene group as $R^0$, di-1,2-butylene glycol mono-tert-pentyl ether having an ethyl group as $R^1$ and an ethylethylene group as $R^0$, and diisobutylene glycol mono-tert-pentyl ether having an ethyl group as $R^1$ and a 1,1-dimethylethylene group as $R^0$.

Particularly preferred are diethylene glycol mono-tert-butyl ether and diethylene glycol mono-tert-pentyl ether.

In a case where n is 3:
Triethylene glycol mono-tert-butyl ether having a methyl group as $R^1$ and an ethylene group as $R^0$, tripropylene glycol mono-tert-butyl ether having a methyl group as $R^1$ and a propylene group as $R^0$, tri-1,2-butylene glycol mono-tert-butyl ether having a methyl group as $R^1$ and an ethylethylene group as $R^0$, truisobutylene glycol mono-tert-butyl ether having a methyl group as $R^1$ and a 1,1-dimethylethylene group as $R^0$, triethylene glycol mono-tert-pentyl ether having an ethyl group as $R^1$ and an ethylene group as $R^0$, tripropylene glycol mono-tert-pentyl ether having an ethyl group as $R^1$ and a propylene group as $R^0$, tri-1,2-butylene glycol mono-tert-pentyl ether having an ethyl group as $R^1$ and an ethylethylene group as $R^0$, and triisobutylene glycol mono-tert-pentyl ether having an ethyl group as $R^1$ and a 1,1-dimethylethylene group as $R^0$.

Particularly preferred are triethylene glycol mono-tert-butyl ether and triethylene glycol mono-tert-pentyl ether.

As the compound (X), a compound wherein n is 1 is particularly preferred, and a compound wherein $R^1$ is a methyl group is particularly preferred. Further, as the compound (X), two or more compounds may be used together.

In a case where the compound (X) and another compound are used together as the organic ligand, the compound to be used together is preferably one or more compounds selected from the group consisting of tert-butyl alcohol, n-butyl alcohol, isobutyl alcohol, tert-pentyl alcohol, isopentyl alcohol, N,N-dimethylacetamide, glyme (ethylene glycol dimethyl ether), diglyme (diethylene glycol dimethyl ether), triglyme (triethylene glycol dimethyl ether), isopropyl alcohol and dioxane. The dioxane may be 1,4-dioxane or 1,3-dioxane, and 1,4-dioxane is preferred. As the compound to be used together, particularly preferred is tert-butyl alcohol, tert-pentyl alcohol or glyme. Most preferred is tert-butyl alcohol In the present invention, the double metal cyanide complex is produced preferably by subjecting the reaction product obtained by reacting the metal halide with the alkali metal cyanometalate, to aging in one kind of organic ligand or a mixed organic ligands of at least two kinds among the above-mentioned organic ligands.

In the case of using the compound (X) and said another compound together as the organic ligands, it is preferred to subject the reaction product obtained by reacting the metal halide with the alkali metal cyanometalate, to aging in the mixed ligands with a weight ratio of the compound (X) to said another compound of from 1/99 to 99/1.

As the method of aging, a method to dropwise add one type of organic ligand or a mixed organic ligands of at least two kinds, to a solution containing the above-mentioned reaction product, followed by stirring, may, for example, be mentioned. The aging temperature is preferably at least the reaction temperature, particularly preferably at least 30° C., and preferably lower than 125° C., particularly preferably at most 80° C. The aging time is preferably at least 15 minutes. Although the upper bound of the aging time is not particularly limited, it is industrially preferred to limit the upper bound to a level of from 2 to 3 hours.

By subjecting the slurry obtained by the above-mentioned aging to filtration, a cake containing the double metal cyanide complex will be obtained. Further, as the case requires, it is preferred to add to said cake a compound selected from the group consisting of water, the organic ligand to be used for the synthesis and an organic ligand other than the organic ligand to be used for the synthesis, for washing, followed by further filtration (washing operation). Said washing operation may be repeated several times. Unless the organic ligand used for washing has a particularly high coordination power as compared with the organic ligand already coordinated to the catalyst, part or all the organic ligand already coordinated is seldom substituted by the organic ligand used for washing.

The obtained cake containing the double metal cyanide complex is dried to obtain the double metal cyanide complex. Drying is carried out by e.g. a drying method by heating, a drying method under vacuum, or a method of mixing with a hardly volatile liquid and then removing water content and the volatile organic ligand. The drying is carried out at a temperature of preferably from 0 to 150° C., particularly preferably at most 90° C. This is to prevent volatilization of the entire coordinated organic solvent and water.

The present invention provides a catalyst for alkylene oxide ring-opening polymerization, which comprises the double metal cyanide complex produced by the above-mentioned method.

The present invention further provides a method for producing a polyether monol or a polyether polyol, which comprises using said catalyst for alkylene oxide ring-opening polymerization comprising the double metal cyanide complex produced by the above-mentioned method. Namely, the present invention provides a method for producing a polyether monol, which comprises subjecting alkylene oxides including an alkylene oxide having a carbon number of at least 3, to ring-opening polymerization with a monohydroxy compound as an initiator in the presence of the above-mentioned catalyst for alkylene oxide ring-opening polymerization of the present invention; and a method for producing a polyether polyol, which comprises subjecting alkylene oxides including an alkylene oxide having a carbon number of at least 3, to ring-opening polymerization with a polyhydroxy compound having at least 2 hydroxyl groups as an initiator in the presence of the above-mentioned catalyst for alkylene oxide ring-opening polymerization of the present invention.

The alkylene oxides include an alkylene oxide having a carbon number of at least 3. As the alkylene oxide having a carbon number of at least 3, propylene oxide, 1,2-butylene oxide, 2,3-butylene oxide or epichlorohydrin may, for example, be mentioned. Two or more of these may be used together, and in such a case, they may be mixed with each other for reaction, or they may be successively subjected to reaction.

In the case of using the catalyst for alkylene oxide ring-opening polymerization of the present invention, ethylene oxide as the alkylene oxide having a carbon number of 2 alone hardly undergoes reaction, and it may undergo reaction by mixing with an alkylene oxide having a carbon number of at least 3 followed by addition to the reaction system.

Particularly preferred alkylene oxide is propylene oxide or a combination of propylene oxide with ethylene oxide.

Further, as mentioned hereinafter, in the case of producing a resilient polyurethane foam by using the polyether polyol of the present invention, the polyether polyol preferably has oxyethylene groups at the terminals, and the content of said terminal oxyethylene group is particularly preferably from 5 to 30 wt %.

The polyether monol or the polyether polyol having oxyethylene groups at the terminals can be produced by subjecting alkylene oxides including an alkylene oxide having a carbon number of at least 3, to ring-opening polymerization with an initiator by using the above-mentioned catalyst for alkylene oxide ring-opening polymerization of the present invention, and then subjecting ethylene oxide to reaction by using an alkali catalyst.

Namely, the present invention provides a method for producing a polyether monol, which comprises subjecting alkylene oxides including an alkylene oxide having a carbon number of at least 3, to ring-opening polymerization with a monohydroxy compound as an initiator in the presence of the above-mentioned catalyst for alkylene oxide ring-opening polymerization, and then subjecting ethylene oxide to ring-opening polymerization in the presence of an alkali catalyst; and a method for producing a polyether polyol, which comprises subjecting alkylene oxides including an alkylene oxide having a carbon number of at least 3, to ring-opening polymerization with a polyhydroxy compound having at least 2 hydroxyl groups as an initiator in the presence of the above-mentioned catalyst for alkylene oxide ring-opening polymerization, and then subjecting ethylene oxide to ring-opening polymerization in the presence of an alkali catalyst.

As the alkali catalyst, an alkali metal such as sodium or potassium, an alkali metal hydroxide such as sodium hydroxide or potassium hydroxide, or an alkali metal alkoxide such as sodium alkoxide or potassium alkoxide, may, for example, be mentioned.

As specific examples of the monohydroxy compound and the polyhydroxy compound having at least 2 hydroxyl groups to be used as the initiator, the following are mentioned. However, such compounds are not limited thereto.

Methanol, isopropyl alcohol, n-butyl alcohol, 2-ethylhexanol, 1-octadecanol, allyl alcohol, oleyl alcohol, ethylene glycol, diethylene glycol, propylene glycol, dipropylene glycol, glycerol, trimethylolpropane, pentaerythritol, diglycerol, sorbitol, dextrose, methyl glucoside, sucrose, bisphenol A, phenol, diethanolamine, triethanolamine and the like. Further, an alkylene oxide addition product of such an initiator may also be used as the initiator. Further, an alkylene oxide addition product of a polyamine such as a monoamine or a diamine may be used. As mentioned hereinafter, in the case of producing a resilient polyurethane foam, it is preferred to use a polyhydroxy compound having from 2 to 8 hydroxyl groups.

The polyether monol or the polyether polyol can be produced by adding the catalyst for alkylene oxide ring-opening polymerization of the present invention to the hydroxy compound as the initiator, and gradually adding the alkylene oxide thereto to carry out the reaction. The amount of said catalyst is not particularly limited, and suitably at a level of from 1 to 5000 ppm, more preferably from 100 to 2000 ppm, based on the hydroxy compound to be used. The reaction temperature is preferably from 30 to 180° C., more preferably from 90 to 130° C. As the introduction of said catalyst to the reaction system, it may be initially introduced all at once, or it may be successively introduced in installments. The polyether polyol after the completion of the reaction may be used directly, and preferably the catalyst is removed.

The hydroxyl number of the obtained polyether monol or polyether polyol is not particularly limited, and the hydroxyl number is preferably from 5 to 70 mgKOH/g.

The polyether monol and the polyether monol obtained by the above-mentioned method, may be used for e.g. a surface active agent and a lubricant. Further, the polyether polyol obtained by the above-mentioned method may be used as a starting material for a polyurethane.

The present invention provides a method for producing a polyurethane compound, which comprises reacting a polyether polyol obtained by the above-mentioned method with an isocyanate group-containing low molecular weight compound.

More preferred is a method for producing a polyurethane foam, which comprises reacting the polyether polyol obtained by the above-mentioned production method with an isocyanate group-containing low molecular weight compound in the presence of a foaming agent. As the polyurethane foam, a resilient polyurethane foam is particularly preferred.

To obtain a resilient polyurethane foam, it is preferred to use a polyether polyol obtained by the above-mentioned production method and satisfying the following conditions (a) to (c).

(a) The number of hydroxyl group is from 2 to 8, (b) the hydroxyl number is from 5 to 38 mgKOH/g, and (c) the oxyethylene group content is from 5 to 30 wt %.

Namely, the present invention provides a method for producing a resilient polyurethane foam, which comprises subjecting alkylene oxides including an alkylene oxide having a carbon number of at least 3, to ring-opening polymerization with a polyhydroxy compound having from 2 to 8 hydroxyl groups as an initiator in the presence of the above-mentioned catalyst for alkylene oxide ring-opening polymerization, and then reacting a polyether polyol having from 2 to 8 hydroxyl groups, a hydroxyl number of from 5 to 38 mgKOH/g and an oxyethylene group content of from 5 to 30 wt % and obtained by ring-opening polymerization of ethylene oxide in the presence of an alkali catalyst, with an isocyanate group-containing low molecular weight compound in the presence of a foaming agent.

The polyether polyol produced by using the catalyst for alkylene oxide ring-opening polymerization of the present invention, has an unsaturation of from 0.005 to 0.02 meq/g with a hydroxyl number of 34, for example. When a resilient polyurethane foam is produced by using this polyether polyol, the above-mentioned problems such as decrease in hardness, decrease in ball rebound, deterioration in compression set, and decrease in curing property at the time of forming a foam, will be minimized, and particularly the crushing property of a sheet cushion will significantly be excellent. Accordingly, crushing will easily be carried out even in a case of producing a sheet cushion having a large size and a complicated shape.

The above-mentioned polyether polyol can be used also as a polymer-dispersed polyether polyol containing fine polymer particles.

The polymer-dispersed polyether polyol is a dispersion of fine polymer particles stably dispersed in polyoxyalkylene polyol matrix. As the polymer, an addition polymerization type polymer or a condensation polymerization type polymer may be mentioned.

The fine polymer particles in the polymer-dispersed polyol comprises an addition polymerization type polymer such as a homopolymer or a copolymer of acrylonitrile, styrene, methacrylate, acrylate or another vinyl monomer, or a condensation polymerization type polymer such as polyester, polyurea, polyurethane or melamine resin. Due to presence of the fine polymer particles, the hydroxyl number of the entire polymer-dispersed polyol is usually low as compared with the hydroxyl number of the polyol as matrix.

The content of the fine polymer particles in the polyol is usually preferably at most 50 wt %. It is not particularly necessary that the amount of the fine polymer particles is high, and there will be no problem except in view of economical feasibility even if it is too high. It is preferably from 3 to 35 wt % in many cases. Although the presence of the fine polymer particles in the polyol is not essential, the presence is effective to improve physical properties of the foam such as hardness or air flow.

Further, in addition to the above-mentioned polyether polyol obtained by the production method of the present invention, another polyether polyol may be used together. For example, a polyether polyol, a polyester polyol or a hydroxyl group-containing olefin type polymer, produced by using a catalyst comprising a double metal cyanide complex other than the double metal cyanide complex of the present invention, a general-purpose alkali catalyst such as an alkali metal including sodium and potassium, an alkali metal hydroxide including sodium hydroxide and potassium hydroxide, or an alkali metal alkoxide including sodium alkoxide and potassium alkoxide, or a cesium catalyst such as cesium hydroxide, may be mentioned.

Further, a low molecular weight compound called a chain-extender or a cross-linking agent may be used together. Specifically, a low molecular weight polyhydric alcohol or a polyhydric amine may, for example, be mentioned.

As the isocyanate group-containing low molecular weight compound to be used in the present invention, preferred is a low molecular weight polyisocyanate having at least 2 isocyanate groups. As the low molecular weight polyisocyanate, an aromatic, alicyclic or aliphatic polyisocyanate, a mixture of at least two of them, and a modified polyisocyanate obtained by modification thereof may, for example, be mentioned.

Specifically, a polyisocyanate such as tolylene diisocyanate (TDI), diphenylmethane diisocyanate (MDI), polymethylene polyphenyl isocyanate (popular name: crude MDI), xylylene diisocyanate (XDI), isophorone diisocyanate (IPDI) or hexamethylene diisocyanate (HMDI), or its prepolymer type modified product, nurate modified product, urea modified product or carbodiimide modified product may, for example, be mentioned.

As the foaming agent, it is preferred to use at least one foaming agent selected from water and an inert gas. As the inert gas, specifically, water or nitrogen may, for example, be mentioned. The amount of such a foaming agent is not particularly limited, and in the case of using water alone, the amount is suitably at most 10 parts by weight, particularly from 0.1 to 8 parts by weight, based on 100 parts by weight of the polyether polyol. Another foaming agent may be used in a suitable amount depending upon demands such as foam magnification.

In the case of reacting the polyether polyol with the isocyanate group-containing low molecular weight compound, it is usually required to use a catalyst. An amine compound or an organic metal compound may, for example, be used. Further, a multiple catalyst for reaction of isocyanate groups in e.g. a metal carboxylate may be used depending upon the purpose.

As the amine compound, triethylenediamine, bis[(2-dimethylamino)ethyl]ether, N,N-dimethylethanolamine, trimethylaminoethylethanolamine or a compound having two molecules of ethylene oxide added to N,N-dimethylethanolamine [$(CH_3)_2NCH_2CH_2(OCH_2CH_2)OH$] may, for example, be mentioned. The amount of such an amine compound is preferably at most 1.0 part by weight, particularly preferably from 0.05 to 1.0 part by weight, based on 100 parts by weight of the polyether polyol.

As the organic metal compound, an organotin compound, Inn an organic bismuth compound, an organic lead compound or an organic zinc compound may, for example, be mentioned, and specifically, di-n-butyltin oxide, di-n- butyltin dilaurate, di-n-butyltin, di-n-butyltin diacetate, di-n-octyltin oxide, di-n-octyltin dilaurate, monobutyltin trichloride, di-n-butyltin dialkylmercaptan or di-n-octyltin dialkylmercaptan may, for example, be mentioned. The amount of such an organic metal compound is preferably at most 1.0 part by weight based on 100 parts by weight of the polyether polyol.

Further, in many cases, a foaming stabilizer to form excellent foams may be used. As the foaming stabilizer, a silicone type foaming stabilizer or a fluorine-containing compound type foaming stabilizer may, for example, be mentioned. As a compounding agent which may optionally be used, a filler, a stabilizer, a coloring agent, a flame retardant or an antifoaming agent may, for example, be mentioned.

The molding of the resilient polyurethane foam is carried out preferably by a method of directly injecting a reactive mixture into a closed mold by using a low-pressure foaming machine or a high-pressure foaming machine (i.e. reaction injection molding), or by a method of spreading a reactive mixture into a mold in an open state. The high-pressure foaming machine is preferably a conventional type of mixing two liquids, one of which is Dok san isocyanate group-containing low molecular weight compound, and the other of which is a mixture of the entire starting materials except the isocyanate group-containing low molecular weight compound. In some cases, a reactive mixture consisting of totally three liquids including a separate liquid containing a catalyst or an antifoaming agent (usually dispersed or dissolved in some of the high molecular weight polyol) is formed, followed by injection.

The compound (X) to be used as the organic ligand for the double metal cyanide complex of the present invention, is a so-called glycol ether having an alkylene oxide added to an alcohol containing a hydroxyl group bonded to a tertiary carbon, in structural view. Although it is not clearly understood how the glycol ether having such a structure exhibits the performances, it has been found that by using the polyether polyol produced by the catalyst, the crushing property of a sheet cushion having a large size and a complicated shape is significantly improved while maintaining comfortableness of the sheet cushion to sit on.

Further, the polyether polyol obtained by the above-mentioned production method of the present invention can be applied to a method for producing a polyurethane elastomer.

Namely, the present invention provides a method for producing a polyurethane elastomer, which comprises reacting an isocyanate group-terminated urethane prepolymer obtained by reacting a first polyether polyol with an isocyanate group-containing low molecular weight compound, with a curing agent containing a second polyether polyol, wherein at least one of the first polyether polyol and the second polyether polyol is the polyether polyol produced by the above-mentioned production method; and a method for producing a polyurethane elastomer, which comprises reacting an isocyanate group-terminated urethane prepolymer obtained by reacting the polyether polyol produced by the above-mentioned production method with an isocyanate group-containing low molecular weight compound, with a curing agent containing an active hydrogen compound other than a polyether polyol as the main component and containing no polyether polyol.

To produce a polyurethane elastomer, it is usually roduced by reacting an isocyanate group-terminated urethane prepolymer obtained by reacting the first polyether polyol with an isocyanate group-containing low molecular weight compound, with a curing agent containing the second polyether polyol, or with a curing agent containing an active hydrogen compound other than a polyether polyol as the main component and containing no polyether polyol.

In the present invention, at least some of the polyether polyol as the starting material for the polyurethane elastomer, is the polyether polyol produced by the above-mentioned production method.

In the method for producing the polyelastomer, it is particularly preferred to use a polyether polyol having an unsaturation of at most 0.01 meq/g. In the case where the unsaturation exceeds 0.01 meq/g, the curing rate may decrease, which will be unfavorable influence on physical properties of the polyurethane elastomer such as elongation or strength. This is considered to be because the amount of the unsaturated monol contained in the polyether polyol is large, whereby the number of hydroxyl group will substantially decrease. As such a polyether polyol, it is particularly preferred to use a polyether polyol produced by using a double metal cyanide complex catalyst having, as organic ligands, both compound (X) and tert-butyl alcohol coordinated thereto.

The isocyanate group-terminated urethane prepolymer can be obtained by reacting an isocyanate group-containing low molecular weight compound with the polyether polyol obtained by the above-mentioned production method and/or another polyether polyol under a condition of a stoichiometrically excess of isocyanate groups. The amount of the isocyanate group-containing low molecular weight compound may be such that an unreacted product will remain, and if the amount of the unreacted product is too large, the unreacted compound can be removed after the completion of the reaction. The isocyanate group content in the obtained isocyanate group-containing polyurethane prepolymer is preferably from 0.1 to 10 wt %. As the isocyanate group-containing low molecular weight compound, the above-mentioned compounds may be used.

As the curing agent, the polyether polyol obtained by the above-mentioned production method, said another polyether polyol or another active hydrogen compound may be used.

In the case of using a polyether polyol, it may also be used as a polymer-dispersed polyol containing fine polymer particles. As the active hydrogen compound other than a polyether polyol, a diamine or a low molecular weight diol may, for example, be used.

For the curing reaction, a curing catalyst may or may not be used. As the curing catalyst, the above-mentioned compounds may be used.

Further, when e.g. a stabilizer or an anti-deterioration agent is used, more excellent weather resistance or heat resistance can be imparted.

In the polyurethane elastomer of the present invention, e.g a reinforcing agent, a filler, a plasticizer, a pigment or an anti-sagging agent may further be contained, as the case requires.

The reinforcing agent may, for example, be carbon black or fine particulate silica. The filler may, for example, be calcium carbonate, talc, clay or silica. The plasticizer may, for example, be dioctyl phthalate, dibutyl phthalate, dioctyl adipate, chlorinated paraffin or a petroleum type plasticizer. The pigment may, for example, be an inorganic pigment such as iron oxide, chromium oxide or titanium oxide or an organic pigment such as phthalocyanine blue or phthalocyanine green. The anti-sagging agent may, for example, be organic acid-treated calcium carbonate, hydrogenated castor oil, aluminum stearate, calcium stearate, zinc stearate or fine particulate silica.

EXAMPLES

Now, the present invention will be explained in further detail with reference to Examples and Comparative Examples. However, it should be understood that the present invention is by no means restricted thereto.

Production of a Double Metal Cyanide Complex

Example 1

To 15 cc of an aqueous solution containing 10 g of zinc chloride, 80 cc of an aqueous solution containing 4 g of potassium hexacyanocobaltate $K_3Co(CN)_6$ with the temperature maintained to be 40° C. was dropwise added over a period of 30 minutes. After the completion of the dropwise addition, a mixture comprising 80 cc of ethylene glycol mono-tert-butyl ether (hereinafter referred to as EGMTBE) and 80 cc of water was added thereto, and the temperature was raised to 60° C. After 1 hour of stirring, a filtration operation was carried out, and a cake containing a double metal cyanide complex was obtained.

Then, to the cake containing the double metal cyanide complex, a mixture comprising 40 cc of EGMTBE and 80 cc of water was added, followed by stirring for 30 minutes, and then filtration was carried out. To the cake containing the double metal cyanide complex thus obtained, a mixture comprising 100 cc of EGMTBE and 10 cc of water was added followed by stirring, and then a filtration operation was carried out. The cake containing the double metal cyanide complex was dried at 80° C. for 4 hours, followed by pulverization, to obtain a double metal cyanide complex A.

Example 2

The same operation as in Example 1 was carried out except that ethylene glycol mono-tert-pentyl ether instead of EGMTBE in Example 1 was used, to obtain a double metal cyanide complex B.

Example 3

To 15 cc of an aqueous solution containing 10 g of zinc chloride, 80 cc of an aqueous solution containing 4 g of $K_3Co(CN)_6$ with the temperature maintained to be 40° C. was dropwise added over a period of 30 minutes. After the completion of the dropwise addition, a mixture comprising 40 cc of EGMTBE, 40 cc of glyme and 80 cc of water was added thereto, and the temperature was raised to 60° C. After 1 hour stirring, a filtration operation was carried out, to obtain a cake containing a double metal cyanide complex.

Then, to the cake containing the double metal cyanide complex, a mixture comprising 20 cc of EGMTBE, 20 cc of glyme and 80 cc of water was added, followed by stirring for 30 minutes, and filtration was carried out. To the cake containing the double metal cyanide complex thus obtained, a mixture comprising 50 cc of EGMTBE, 50 cc of glyme and 10 cc of water was further added, followed by stirring, and then a filtration operation was carried out. The cake containing the double metal cyanide complex was dried at 90° C. for 3 hours, followed by pulverization, to obtain a double metal cyanide complex C.

Example 4

The same operation as in Example 3 was carried out except that tert-butyl alcohol was used instead of the glyme in Example 3, to obtain a double metal cyanide complex D.

Example 5

The same operation as in Example 3 was carried out except that ethylene glycol mono-tert-pentyl ether instead of EGMTBE in Example 3 was used, and tert-butyl alcohol instead of the glyme was used, to obtain a double metal cyanide complex E.

Example 6.

The same operation as in Example 1 was carried out except that diethylene glycol mono-tert-butyl ether instead of the EGMTBE in Example 1 was used, to obtain a double metal cyanide complex F.

Example 7

To 15 cc of an aqueous solution containing 10 g of zinc chloride, 80 cc of an aqueous solution containing 4 g of $K_3Co(CN)_6$ with the temperature maintained to be 40° C. was dropwise added over a period of 30 minutes. After the completion of the dropwise addition, a mixture comprising 80 cc of glyme and 80 cc of water was added, and the temperature was raised to 60° C. After 1 hour of stirring, a filtration operation was carried out, to obtain a cake containing a double metal cyanide complex.

Then, to the cake containing the double metal cyanide complex, a mixture comprising 40 cc of glyme and 80 cc of water was added, followed by stirring for 30 minutes, and then filtration was carried out. To the cake containing the double metal cyanide complex thus obtained, a mixture comprising 100 cc of glyme and 10 cc of water was further added followed by stirring, and then a filtration operation was carried out. The cake containing the double metal cyanide complex was dried at 80° C. for 4 hours, followed by pulverization, to obtain a double metal cyanide complex G.

Example 8

The same operation as in Example 7 was carried out except that tert-butyl alcohol instead of the glyme in Example 7 was used, to obtain a double metal cyanide complex H.

Example 9

40 cc of an aqueous solution containing 10 g of zinc chloride and 7 cc of tert-butyl alcohol were mixed (solution 1). 13 cc of an aqueous solution containing 1 g of $K_3Co(CN)_6$ was prepared in another beaker (solution 2). Further, 7 cc of water, 0.3 cc of tert-butyl alcohol and 1 cc of tripropylene glycol monomethyl ether were mixed in another beaker (solution 3). The solution 1 was dropwise added to the solution 2 over a period of 30 minutes at a temperature of 50° C., followed by mixing with a homogenizer, and then the solution 3 was added thereto followed by mixing, and filtration was carried out, to obtain a cake contained a double metal cyanide complex.

Then, to the cake containing the double metal cyanide complex, a mixture comprising 17 cc of tert-butyl alcohol and 7 cc of water was added followed by stirring with a homogenizer for 10 minutes, and 0.3 cc of tripropylene glycol monomethyl ether was added thereto followed by mixing for 3 minutes, then filtration was carried out. To the cake containing the double metal cyanide complex thus obtained, 25 cc of tert-butyl alcohol was further added followed by stirring by a homogenizer for 10 minutes, and 0.2 cc of tripropylene glycol monomethyl ether was added thereto followed by mixing for 3 minutes, then a filtration operation was carried out. The cake containing the double metal cyanide complex was dried at 60° C. for 3 hours, followed by pulverization, to obtain a double metal cyanide complex I.

The ligands for the double metal cyanide complexes obtained in the above-mentioned Examples 1 to 6 (Working Examples) and Examples 7 to 9 (Comparative Examples) are shown in Table 1.

Example 40

To 15 cc of an aqueous solution containing 10 g of zinc chloride, 80 cc of an aqueous solution containing 4 g of potassium hexacyanocobaltate $K_3Co(CN)_6$ with the temperature maintained to be 40° C. was dropwise added over a period of 30 minutes. After the completion of the dropwise addition, a mixture comprising 16 cc of EGMTBE, 64 cc of tert-butyl alcohol and 80 cc of water was added, and the temperature was raised to 60° C. After 1 hour of stirring, a filtration operation was carried out, to obtain a cake containing a double metal cyanide complex. Then, to the cake containing the double metal cyanide complex, a mixture comprising 8 cc of EGMTBE, 32 cc of tert-butyl alcohol and 80 cc of water was added followed by stirring for 30 minutes, and filtration was carried out. To the cake containing the double metal cyanide complex thus obtained, a mixture comprising 20 cc of EGMTBE, 80 cc of tert-butyl alcohol and 10 cc of water was further added followed by stirring, and then a filtration operation was carried out. The cake containing the double metal cyanide complex was dried at 80° C. for 3 hours, followed by pulverization, to obtain a double metal cyanide complex catalyst J.

Example 41

To 15 cc of an aqueous solution containing 10 g of zinc chloride, 80 cc of an aqueous solution containing 4 g of potassium hexacyanocobaltate $K_3Co(CN)_6$ with the temperature maintained to be 40° C. was dropwise added over a period of 30 minutes. After the completion of the dropwise addition, a mixture comprising 64 cc of EGMTBE, 16 cc of tert-butyl alcohol and 80 cc of water was added thereto, and the temperature was raised to 60° C. After 1 hour of stirring, a filtration operation was carried out, to obtain a cake containing a double metal cyanide complex.

Then, to the cake containing the double metal cyanide complex, a mixture comprising 32 cc of monoethylene glycol mono-tert-butyl ether, 8 cc of tert-butyl alcohol and 80 cc of water was added followed by stirring for 30 minutes, and then filtration was carried out. To the cake containing the double metal cyanide complex thus obtained, a mixture comprising 80 cc of EGMTBE, 20 cc of tert-butyl alcohol and 10 cc of water was further added followed by stirring, and then a filtration operation was carried out. The cake containing the double metal cyanide complex was dried at 80° C. for 3 hours, followed by pulverization, to obtain a double metal cyanide complex catalyst K.

The ligands for the double metal cyanide complexes obtained in the above-mentioned Examples 40 and 41 (Working Examples) are shown in Table 7.

Production of a Polyether Polyol

Example 10

To a stainless pressure reactor of 10 l, 1000 g of polyoxypropylene triol having a molecular weight of 1000 obtained by reacting propylene oxide (hereinafter referred to as PO) with glycerol, and 1.2 g of the double metal cyanide complex A as a catalyst, were introduced. After replacement by nitrogen, the temperature was raised to 120° C., and 5000 g of PO was reacted therewith, followed by aging until the pressure in the system became constant. Then, a methanol solution of sodium methoxide was added thereto, and after distillation of methanol, 1120 g of ethylene oxide (hereinafter referred to as EO) was reacted therewith. After removal of the catalyst, a polyol A1 was obtained.

Example 11

The same operation as in Example 10 was carried out except that the double metal cyanide complex B instead of the double metal cyanide complex A in Example 10 was used, to obtain a polyol B1.

Example 12

The same operation as in Example 10 was carried out except that the double metal cyanide complex C instead of the double metal cyanide complex A in Example 10 was used, to obtain a polyol C1.

Example 13

The same operation as in Example 10 was carried out except that the double metal cyanide complex D instead of the double metal cyanide complex A in Example 10 was used, to obtain a polyol D1.

Example 14

The same operation as in Example 10 was carried out except that the double metal cyanide complex E instead of the double metal cyanide complex A in Example 10 was used, to obtain a polyol E1.

Example 15

The same operation as in Example 10 was carried out except that the double metal cyanide complex F instead of the double metal cyanide complex A in Example 10 was used, to obtain a polyol F1.

Example 16

To a stainless pressure reactor of 10 l, 800 g of polyoxypropylene triol having a molecular weight of 1000 obtained by reacting PO with glycerol, and 1.3 g of the double metal cyanide complex A as a catalyst, were introduced. After replacement by nitrogen, the temperature was raised to 120° C., and 6050 g of PO was reacted therewith, followed by aging until the pressure in the system became constant. Then, an aqueous potassium hydroxide solution was added thereto, and after distillation of methanol, 1030 g of EO was reacted therewith. After removal of the catalyst, a polyol A2 was obtained.

Example 17

The same operation as in Example 16 was carried out except that the double metal cyanide complex B instead of the double metal cyanide complex A in Example 16 was used, to obtain a polyol B2.

Example 18

To a stainless pressure reactor of 10 l, 1782 g of polyoxypropylene triol having a molecular weight of 1000 obtained by reacting PO with glycerol, and 1.5 g of the double metal cyanide complex D as a catalyst, were introduced. After replacement by nitrogen, the temperature was raised to 120° C., and 6047 g of PO was reacted therewith, followed by aging until the pressure in the system became constant. Then, a methanol solution of sodium methoxide was added thereto, and after distillation of methanol, 1171 g of EO was reacted therewith. After removal of the catalyst, a polyol D2 was obtained.

Example 19

To a stainless pressure reactor of 10 l, 1782 g of polyoxypropylene triol having a molecular weight of 1000 obtained by reacting PO with glycerol, and 1.4 g of the double metal cyanide complex F as a catalyst, were introduced. After replacement by nitrogen, the temperature was raised to 120° C., and 5418 g of PO was reacted therewith, followed by aging until the pressure in the system became constant. Then, a methanol solution of sodium methoxide was added thereto, and after distillation of methanol; 1800 g of EO was reacted therewith. After removal of the catalyst, a polyol F2 was obtained.

Example 20

To a stainless pressure reactor of 10 l, 1000 g of polyoxypropylene triol having a molecular weight of 1000 obtained by reacting PO with glycerol, and 1.2 g of the double metal cyanide complex G as a catalyst, were introduced. After replacement by nitrogen, the temperature was raised to 120° C., and 5000 g of PO was reacted therewith, followed by aging until the pressure in the system became constant. Then, a methanol solution of sodium methoxide was added thereto, and after distillation of methanol, 1120 g of EO was reacted therewith. After removal of the catalyst, a polyol G1 was obtained.

Example 21

The same operation as in Example 20 was carried out except that the double metal cyanide complex H instead of the double metal cyanide complex G in Example 20 was used, to obtain a polyol H1.

Example 22

The same operation as in Example 20 was carried out except that the double metal cyanide complex I instead of the double metal cyanide complex G in Example 20 was used, to obtain a polyol I1.

Example 23

To a stainless pressure reactor of 10 l, 800 g of polyoxypropylene triol having a molecular weight of 1000 obtained by reacting PO with glycerol, and 1.3 g of the double metal cyanide complex G as a catalyst, were introduced. After replacement by nitrogen, the temperature was raised to 120° C., and 6050 g of PO was reacted therewith, followed by aging until the pressure in the system became constant. Then, an aqueous potassium hydroxide solution was added thereto, and 1030 of EO was reacted therewith. After removal of the catalyst, a polyol G2 was obtained.

Example 24

To a stainless pressure reactor of 10 l, 1782 g of polyoxypropylene triol having a molecular weight of 1000 obtained by reacting PO with glycerol, and 1.5 g of the double metal cyanide complex H as a catalyst, were introduced. After replacement by nitrogen, the temperature was raised to 120° C., and 6047 g of PO was reacted therewith, followed by aging until the pressure in the system became constant. Then, an aqueous potassium hydroxide solution was added thereto, and 1171 g of EO was reacted therewith. After removal of the catalyst, a polyol H2 was obtained.

The catalyst for alkylene oxide ring-opening polymerization used, and the oxyethylene group content (EO content, unit: wt %), the hydroxyl number (unit: mgKOH/g) and the total unsaturation (unit: meq/g) of the obtained polyol, in each of the above-mentioned Examples to 19 (Working Examples) and Examples 20 to 24 (Comparative Examples), are shown in Table 2.

Example 42

To a stainless pressure reactor of 10 l, 1000 g of polyoxypropylene triol having a molecular weight of 1000 obtained by reacting PO with glycerol, and 1.2 g of the double metal cyanide complex J as a catalyst, were introduced. After replacement by nitrogen, the temperature was raised to 120° C., and 5000 g of PO was reacted therewith, followed by aging until the pressure in the system became constant. Then, potassium hydroxide was introduced thereto, and 1120 g of EO was reacted therewith. After removal of the catalyst, a polyol J1 was obtained.

Example 43

The same operation as in Example 42 was carried out except that the double metal cyanide complex K instead of the double metal cyanide complex J in Example 42 was used, to obtain a polyol K1.

Example 44

To a stainless pressure reactor of 10 l. 800 g of polyoxypropylene diol having a molecular weight of 1000 obtained by reacting PO with propylene glycol, and 0.83 g of the double metal cyanide complex J as a catalyst, were introduced. After replacement by nitrogen, the temperature was raised to 120° C., and 7520 g of PO was reacted therewith, followed by aging until the pressure in the system became constant. After removal of the catalyst, a polyol J2 was obtained. The polyol J2 was measured by means of gel permeation chromatography, whereupon the molecular weight distribution ($M_w/M_n$) calculated as polystyrene was 1.04, and the viscosity was 4350 cP/25° C.

Example 45

To a stainless pressure reactor of 10 l, 800 g of polyoxypropylene diol having a molecular weight of 1000 obtained by reacting PO with propylene glycol, and 0.83 g of the double metal cyanide complex H as a catalyst, were introduced. After replacement by nitrogen, the temperature was raised to 120° C., and 7520 g of PO was reacted therewith, followed by aging until the pressure in the system became constant. After removal of the catalyst, a polyol H3 was obtained. The polyol H3 was measured by means of gel permeation chromatography, whereupon the molecular weight distribution ($M_w/M_n$) calculated as polystyrene was 1.48, and the viscosity was 10200 cP/25° C.

The catalyst for alkylene oxide ring-opening polymerization used, and the oxyethylene group content (EO content, unit: wt %), the hydroxyl number (unit: mgKOH/g) and the total unsaturation (unit: meq/g) of the polyol obtained, in each of the above-mentioned Examples 42 to 44 (Working Examples) and Example 45 (Comparative Example), are shown in Table 8.

Production of a Flexible Polyurethane Foam

A resilient polyurethane foam was produced by the following method. Examples 25 to 34 are Working Examples, Examples 35 to 39 are Comparative Examples, and Examples 46 and 47 are Working Examples.

Formulation components of the starting materials other than the polyol, are shown in Table 3. As the polyol, 100 parts by weight of a polyol mixture obtained by mixing 30 parts by weight of a polymer-dispersed polyol having a polymer content of 20 wt % obtained by polymerization of acrylonitrile in the polyol as shown in the Table, column "POP", and 70 parts by weight of the polyol as shown in the Table, column "polyol", was used.

100 Parts by weight of said polyol, and 3.0 parts by weight of the crosslinking agent s, 1.0 part by weight of the foam stabilizer v, 3.0 parts by weight of the foaming agent x, 0.4 part by weight of the amine catalyst t and 0.1 part by weight of the amine catalyst u, as shown in Table 3, were mixed to obtain a polyol system liquid.

The polyol system liquid was put in one starting material tank of a reaction injection molding apparatus (high-pressure foaming machine), and the liquid temperature was adjusted to be from 25 to 30° C. Further, the polyisocyanate (α–δ) liquid was put into the other starting material tank of the reaction injection molding apparatus, and the liquid temperature was adjusted to be from 25 to 30° C.

Both were mixed in such a proportion that the isocyanate index (index) would be as shown in Tables 4 to 6 and Table 9, followed by injection. The isocyanate index is represented by the equivalent amount of the isocyanate compound to 100 equivalent amount of the total active hydrogen compounds. The injection conditions were such that the injection pressure was 140 kg/cm$^2$, and the injection amount was 300 g/sec. As the injection mold, a mold having an inner size of 400 mm×400 mm×100 mm (t) was used as closed, and the mold temperature was adjusted to be from 58 to 62° C. The release from the mold was carried out 5 minutes after the injection of the starting materials.

Of the obtained highly resilient polyurethane foam, foam physical properties, vibration characteristics and molding properties are shown in Tables 4 to 6. As the foam physical properties, the overall density (unit: kg/m$^3$), 25% ILD (unit: kg/314 cm$^2$), the air flow (unit: ft$^3$/min), the ball rebound (unit: %), the compression set (unit: %) and the wet compression set (unit: %) were evaluated.

The vibration characteristics were in accordance with JASO B407. Namely, an iron polishing plate of 50 kgf was put on a test piece, followed by vibration upward and downward with a vibration amplitude of 2.5 mm of a vibration stand, whereupon the resonance frequency (unit: Hz) and the transmissibility at 6 Hz were evaluated.

With respect to the molding properties, crushing properties were evaluated by making the molding sample pass through a roller with a width of 50 mm (25% to the initial thickness of the molding sample), 1 minute after release from the mold. Evaluation of the crushing properties was such that ⊚: crushing was very easily carried out and excellent, ○: crushing was relatively easily carried out and fairly good, Δ: some crushing fractures were formed, and X: many crushing fractures were formed.

TABLE 1

| | Catalyst | Ligand |
|---|---|---|
| Ex. 1 | A | Ethylene glycol mono-tert-butyl ether |
| EX. 2 | B | Ethylene glycol mono-tert-pentyl ether |
| Ex. 3 | C | Ethylene glycol mono-tert-butyl ether and glyme |
| Ex. 4 | D | Ethylene glycol mono-tert-butyl ether and tert-butyl alcohol |
| Ex. 5 | E | Ethylene glycol mono-tert-pentyl ether and tert-butyl alcohol |
| Ex. 6 | F | Diethylene glycol mono-tert-butyl ether |
| Bx. 7 | G | Glyme |
| Ex. 8 | H | tert-Butyl alcohol |
| Ex. 9 | I | Tripropylene glycol monomethyl ether and tert-butyl alcohol |

TABLE 2

| | Catalyst | Polyol | EO content | Hydroxyl number | Total unsaturation |
|---|---|---|---|---|---|
| Ex. 10 | A | Polyol A1 | 16 | 24.0 | 0.018 |
| Ex. 11 | B | Polyol B1 | 16 | 24.3 | 0.020 |
| Ex. 12 | C | Polyol C1 | 16 | 24.1 | 0.022 |
| Ex. 13 | D | Polyol D1 | 16 | 23.7 | 0.013 |
| Ex. 14 | E | Polyol E1 | 16 | 23.8 | 0.015 |
| Ex. 15 | F | Polyol F1 | 16 | 23.7 | 0.019 |
| Ex. 16 | A | Polyol A2 | 12 | 17.2 | 0.022 |
| Ex. 17 | B | Polyol B2 | 12 | 16.9 | 0.017 |
| Ex. 18 | D | Polyol D2 | 13 | 33.2 | 0.011 |
| Ex. 19 | F | Polyol F2 | 20 | 33.1 | 0.015 |
| Ex. 20 | G | Polyol G1 | 16 | 24.1 | 0.019 |
| Ex. 21 | H | Polyol H1 | 16 | 23.7 | 0.005 |
| Ex. 22 | I | Polyol I1 | 16 | 23.6 | 0.005 |
| Ex. 23 | G | Polyol G2 | 12 | 17.0 | 0.020 |
| Ex. 24 | H | Polyol H2 | 13 | 33.0 | 0.006 |

TABLE 3

| | |
|---|---|
| Crosslinking agent s | Propylene oxide/ethylene oxide addition product of sorbitol, hydroxyl number: 450 mgKOH/g |
| Foam stabilizer v | SRX-274C (manufactured by Toray Dow Corning Silicone) |
| Foaming agent x | Water |
| Amine catalyst t | TEDA L-33 (manufactured by TOSOH CORPORATION) |
| Amine catalyst u | TOYOCAT-ET (manufactured by TOSOH CORPORATION) |
| Polyisocyanate α | TDI80 (a mixture comprising 2,4-TDI and 2,6-TDI with a weight ratio of 80/20), isocyanate group content: 48.3 wt % |
| Polyisocyanate β | A mixture comprising TDI80 and crude MDI with a weight ratio of 80/20, isocyanate group content: 44.6 wt % |
| Polyisocyanate γ | Denatured MDI containing 2,4'-MDI (10 wt %) and crude MDI (30 wt %), isocyanate group content: 25.0 wt % |
| Polyisocyanate δ | A mixture comprising polyisocyanate γ and polyisocyanate α with a weight ratio of 90/10, isocyanate group content: 30 wt % |

TABLE 4

| Ex. | 25 | 26 | 27 | 28 | 29 | 30 |
|---|---|---|---|---|---|---|
| Polyol | A1 | B1 | C1 | D1 | E1 | F1 |
| POP | A1 | B1 | C1 | D1 | B1 | F1 |
| Polyisocyanate α | 105 | | | | | |
| Polyisocyanate β | | 105 | | | 105 | 105 |
| Polyisocyanate γ | | | 92 | | | |
| Polyisocyanate δ | | | | 92 | | |
| Overall density | 55.0 | 55.3 | 54.9 | 54.8 | 55.6 | 56.0 |
| 25% ILD | 20.0 | 20.3 | 21.2 | 20.8 | 20.6 | 20.8 |

TABLE 4-continued

| Ex. | 25 | 26 | 27 | 28 | 29 | 30 |
|---|---|---|---|---|---|---|
| Air flow | 2.4 | 2.8 | 2.6 | 2.5 | 2.9 | 2.8 |
| Ball rebound | 73 | 75 | 67 | 68 | 75 | 76 |
| Compression set | 3.2 | 3.2 | 3.0 | 3.1 | 3.4 | 3.6 |
| Wet compression set | 9.1 | 9.1 | 8.1 | 7.2 | 9.3 | 9.1 |
| Resonance frequency | 3.5 | 3.1 | 3.3 | 3.1 | 3.2 | 3.1 |
| 6 Hz transmissibility | 0.53 | 0.48 | 0.55 | 0.52 | 0.49 | 0.50 |
| Crushing properties | ⊚ | ⊚ | ⊚ | ⊚ | ⊚ | ⊚ |

TABLE 5

| Ex. | 31 | 32 | 33 | 34 | 35 | 36 |
|---|---|---|---|---|---|---|
| Polyol | A2 | B2 | D2 | F2 | G1 | H1 |
| POP | A2 | B2 | D2 | F2 | G1 | H1 |
| Polyisocyanate α | 105 | | 105 | | | |
| Polyisocyanate β | | 105 | | 105 | 105 | 105 |
| Overall density | 55.0 | 55.3 | 54.9 | 54.8 | 55.6 | 56.0 |
| 25% ILD | 17.8 | 18.6 | 21.2 | 22.8 | 19.2 | 20.8 |
| Air flow | 2.4 | 2.8 | 2.6 | 2.1 | 2.0 | 1.9 |
| Ball rebound | 76 | 77 | 73 | 68 | 72 | 70 |
| Compression set | 3.7 | 3.1 | 3.0 | 3.1 | 3.4 | 3.5 |
| Wet compression set | 8.6 | 7.6 | 8.2 | 8.6 | 8.2 | 8.9 |
| Resonance frequency | 3.2 | 3.0 | 3.3 | 3.3 | 3.4 | 3.6 |
| 6 Hz transmissibility | 0.53 | 0.48 | 0.55 | 0.56 | 0.60 | 0.58 |
| Crushing properties | ⊚ | ⊚ | ⊚ | ⊚ | Δ | Δ |

TABLE 6

| Ex. | 37 | 38 | 39 |
|---|---|---|---|
| Polyol | I1 | G2 | H2 |
| POP | I1 | G2 | H2 |
| Polyisocyanate α | 105 | | |
| Polyisocyanate β | | 105 | 105 |
| Overall density | 54.0 | 55.1 | 54.7 |
| 25% ILD | 20.2 | 19.1 | 21.8 |
| Air flow | 1.8 | 2.2 | 2.2 |
| Ball rebound (%) | 69 | 74 | 70 |
| Compression set | 3.5 | 3.2 | 3.0 |
| Wet compression set | 9.6 | 9.1 | 8.1 |
| Resonance frequency | 3.7 | 3.1 | 3.6 |
| 6 Hz transmissibility | 0.58 | 0.50 | 0.55 |
| Crushing properties | Δ | Δ | Δ |

TABLE 7

| | Catalyst | Ligand |
|---|---|---|
| Ex. 40 | J | Ethylene glycol mono-tert-butyl ether and tert-butyl alcohol |
| Ex. 41 | K | Ethylene glycol mono-tert-butyl ether and tert-butyl alcohol |

TABLE 8

| | Catalyst | Polyol | EO content | Hydroxyl number | Total unsaturation |
|---|---|---|---|---|---|
| Ex. 42 | J | Polyol J1 | 16 | 24.0 | 0.007 |
| Ex. 43 | K | Polyol K1 | 16 | 24.3 | 0.015 |
| Ex. 44 | J | Polyol J2 | 0 | 11.0 | 0.006 |
| Ex. 45 | H | Polyol H3 | 0 | 11.2 | 0.007 |

TABLE 9

| Ex. | 46 | 47 |
|---|---|---|
| Polyol | J1 | K1 |
| POP | J1 | K1 |
| Polyisocyanate β | 105 | 105 |
| Overall density | 53.3 | 54.9 |
| 25% ILD | 21.2 | 20.8 |
| Air flow | 2.9 | 2.8 |
| Ball rebound | 75 | 77 |
| Compression set | 3.0 | 2.9 |
| Wet compression set | 9.1 | 9.1 |
| Resonance frequency | 3.1 | 3.2 |
| 6 Hz transmissibility | 0.49 | 0.51 |
| Crushing properties | ⊚ | ⊚ |

INDUSTRIAL APPLICABILITY

A resilient polyurethane foam produced by using a polyether polyol produced by reacting alkylene oxide with a polyhydroxy compound having at least 2 hydroxyl groups as an initiator in the presence of the catalyst for alkylene oxide ring-opening polymerization of the present invention, is excellent in foam physical properties, vibration characteristics and molding properties. The crushing property of a sheet cushion having a large size and a complicated shape will significantly be improved while maintaining comfortableness of the sheet cushion to sit on.

What is claimed is:

1. A catalyst for alkylene oxide ring-opening polymerization, which comprises a double metal cyanide complex catalyst having, as an organic ligand, a compound represented by the formula (1) or the compound represented by the formula (1) and another compound, coordinated thereto:

$$R^1\text{---}C(CH_3)_2(OR^0)_n OH \tag{1}$$

wherein $R^1$ is a methyl group or an ethyl group, $R^0$ is an ethylene group or a group having a hydrogen atom in said ethylene group substituted by a methyl group or an ethyl group, and n is an integer of from 1 to 3.

2. The catalyst for alkylene oxide ring-opening polymerization according to claim 1, wherein said another compound to be used together with the compound represented by the formula (1) is one or more compounds selected from the group consisting of tert-butyl alcohol, n-butyl alcohol, isobutyl alcohol, tert-pentyl alcohol, isopentyl alcohol, N,N-dimethylacetamide, glyme, diglyme, triglyme, isopropyl alcohol and dioxane.

3. A method for producing a double metal cyanide complex, which comprises having an organic ligand coordinated to a reaction product obtained by reacting a metal halide with an alkali metal cyanometalate, in an aqueous medium, wherein a compound represented by the formula (1), or the compound represented by the formula (1) and another compound, are used as the organic ligand:

$$R^1\text{---}C(CH_3)_2 (OR^0)_n OH \tag{1}$$

wherein $R^1$ is a methyl group or an ethyl group, $R^0$ is an ethylene group or a group having a hydrogen atom in said ethylene group substituted by a methyl group or an ethyl group, and n is an integer of from 1 to 3.

4. A method for producing a polyether monol, which comprises subjecting alkylene oxides including an alkylene oxide having a carbon number of at least 3, to ring-opening polymerization with a monohydroxy compound as an initiator in the presence of the catalyst for alkylene oxide ring-opening polymerization as defined in claim 1, and then optionally subjecting ethylene oxide to ring-opening polymerization in the presence of an alkali catalyst.

5. A method for producing a polyether polyol, which comprises subjecting alkylene oxides including an alkylene oxide having a carbon number of at least 3, to ring-opening polymerization with a polyhydroxy compound having at least 2 hydroxyl groups as an initiator in the presence of the catalyst for alkylene oxide ring-opening polymerization as defined in claim 1, and then optionally subjecting ethylene oxide to ring-opening polymerization in the presence of an alkali catalyst.

6. A method for producing a polyurethane compound, which comprises reacting the polyether polyol produced by the production method as defined in claim 5 with an isocyanate group-containing low molecular weight compound.

7. A method for producing a polyurethane foam, which comprises reacting the polyether polyol produced by the production method as defined in claim 5 with an isocyanate group-containing low molecular weight compound in the presence of a foaming agent.

8. A method for producing a resilient polyurethane foam, which comprises subjecting alkylene oxides including an alkylene oxide having a carbon number of at least 3, to ring-opening polymerization with a polyhydroxy compound having from 2 to 8 hydroxyl groups as an initiator in the presence of the catalyst for alkylene oxide ring-opening polymerization as defined in claim 1, and then reacting a polyether polyol having from 2 to 8 hydroxyl groups, a hydroxyl number of from 5 to 38 mgKOH/g and an oxyethylene group content of from 5 to 30 wt % and obtained by ring-opening polymerization of ethylene oxide in the presence of an alkali catalyst, with an isocyanate group-containing low molecular weight compound in the presence of a foaming agent.

9. A method for producing a polyurethane elastomer, which comprises reacting an isocyanate group-terminated urethane prepolymer obtained by reacting a first polyether polyol with an isocyanate group-containing low molecular weight compound, with a curing agent containing a second polyether polyol, wherein at least one of the first polyether polyol and the second polyether polyol is the polyether polyol produced by the production method as, defined in claim 5.

10. A method for producing a polyurethane elastomer, which comprises reacting an isocyanate group-terminated urethane prepolymer obtained by reacting the polyether polyol produced by the production method as defined in claim 5 with an isocyanate group-containing low molecular weight compound, with a curing agent containing an active hydrogen compound other than a polyether polyol as the main component and containing no polyether polyol.

* * * * *